(12) United States Patent
Sugrim et al.

(10) Patent No.: US 12,399,346 B2
(45) Date of Patent: Aug. 26, 2025

(54) OPTICAL DEVICE WITH THERMALLY CONDUCTIVE FINGERS AND RELATED METHOD

(71) Applicants: UNIVERSITY OF CENTRAL FLORIDA RESEARCH FOUNDATION, INC., Orlando, FL (US); The U.S.A. as represented by the secretary of the Navy, Arlington, VA (US)

(72) Inventors: Chandraika Sugrim, Saint Augustine, FL (US); Aravinda Kar, Orlando, FL (US)

(73) Assignees: UNIVERSITY OF CENTRAL FLORIDA RESEARCH FOUNDATION, INC., Orlando, FL (US); THE U.S.A. AS REPRESENTED BY THE SECRETARY OF THE NAVY, Arlington, VA (US)

( * ) Notice: Subject to any disclaimer, the term of this patent is extended or adjusted under 35 U.S.C. 154(b) by 637 days.

(21) Appl. No.: 17/451,376

(22) Filed: Oct. 19, 2021

(65) Prior Publication Data
US 2022/0121002 A1    Apr. 21, 2022

Related U.S. Application Data

(60) Provisional application No. 63/093,827, filed on Oct. 20, 2020.

(51) Int. Cl.
G02B 7/18      (2021.01)
G02B 7/195     (2021.01)
H01S 3/04      (2006.01)

(52) U.S. Cl.
CPC .......... *G02B 7/1815* (2013.01); *G02B 7/195* (2013.01); *H01S 3/0401* (2013.01)

(58) Field of Classification Search
CPC ...... G02B 7/1815; G02B 7/181; G02B 7/195; H01S 3/0401
(Continued)

(56) References Cited

U.S. PATENT DOCUMENTS 1,530,441 A * 3/1925 Thomson .............. F21V 29/505
                                              362/345
3,909,118 A * 9/1975 Schmidt ................ H01L 23/467
                                              359/845

(Continued)

OTHER PUBLICATIONS

Wang et al. "Optically reconfigurable metasurfaces and photonic devices based on phase change materials" http:s// ePrints Sotonhttps://eprints.soton.ac.uk ;pp. 13.

(Continued)

*Primary Examiner* — George G. King
(74) *Attorney, Agent, or Firm* — Allen, Dyer, Doppelt + Gilchrist, PA

(57) ABSTRACT

An optical device may include an optical body having first and second opposing sides, and passageways extending between the first and second opposing sides. The optical device includes a mirror layer carried by the optical body adjacent the second opposing side, thermally conductive fingers extending in the passageways, and a heatsink carried by the optical body adjacent the first opposing side and coupled to the thermally conductive fingers.

18 Claims, 14 Drawing Sheets

(58) Field of Classification Search
USPC .......................................................... 359/845
See application file for complete search history.

(56) References Cited

U.S. PATENT DOCUMENTS

| | | | | |
|---|---|---|---|---|
| 3,942,880 | A * | 3/1976 | Zeiders, Jr. ............... | G02B 5/08 |
| | | | | 165/83 |
| 4,721,376 | A * | 1/1988 | Fushchetto .......... | G02B 7/1815 |
| | | | | 359/845 |
| 8,894,225 | B2 | 11/2014 | Hauf | |
| 10,359,603 | B1 | 7/2019 | Reardon | |
| 2004/0051984 | A1 * | 3/2004 | Oshino .................. | G02B 7/008 |
| | | | | 359/845 |
| 2006/0227826 | A1 * | 10/2006 | Balogh .................. | G21K 1/062 |
| | | | | 372/34 |
| 2014/0098352 | A1 * | 4/2014 | Hauf ................... | G03F 7/70891 |
| | | | | 355/30 |
| 2015/0124336 | A1 * | 5/2015 | Kaufman .................. | G01J 3/36 |
| | | | | 359/728 |

OTHER PUBLICATIONS

Chang et al. Annual Review of Materials Research "Optical Metasurfaces: Progress and Applications" Annu. Rev. Mater. Res. 2018. 48:7.1-7.24: pp. 24.

Baudet et al. "3D-printing of arsenic sulfide chalcogenide glasses" vol. 9, No. 5 / May 1, 2019 / Optical Materials Express 2307: pp. 11.

Zolfaghari et al. "Additive manufacturing of precision optics at micro and nanoscale" Int. J. Extrem. Manuf. 1 (2019) 012005; pp. 18.

Willis et al. "Printed Optics: 3D Printing of Embedded Optical Elements for Interactive Devices" UIST' 12, Oct. 7-10, 2012: pp. 10.

Ota et al. "Application of 3D Printing for Smart Objects with Embedded Electronic Sensors and Systems" Adv. Mater. Techno/. 2016: pp. 22.

Sadeqi et al. Three dimensional printing of metamaterial embedded geometrical optics (MEGO): Microsystems & Nanoengineering (2019)5:16; pp. 10.

Wu et al. "Emerging Progress of Inkjet Technology in Printing Optical Materials" Adv. Optical Mater. 2016, 4, pp. 1915-1932.

Beller et al. "Methods of Depositing Anti-Reflective Coatings for Additivel Y Manufactured Optics" Sandia National Laboratories 2018.

Friel et al. "3D Printed Radar Lenses with Anti-Reflective Structures" Designs 2019, 3, 28; doi:10.3390/designs3020028; pp. 11.

Zhu et al. "Dynamically Reconfigurable Metadevice Employing Nanostructured Phase-Change Materials" Nano Lett. 2017, 17, pp. 4881-4885.

Brunner et al. "Antireflective "moth-eye" structures on tunable optical silicone membranes" Applied Optics / vol. 51, No. 19 / Jul. 1, 2012; pp. 7.

Gu et al. "High-performance reconfigurable meta-optics based on optical phase change materials (Rising Researcher) (Conference Presentation)" Proceedings vol. 11389, Micro- and Nanotechnology Sensors, Systems, and Applications XII; 1138900 (2020) https://doi.org/10.1117/12.2557439; Event: SPIE Defense + Commercial Sensing, 2020, Abstract Only.

Wachtel, II et al. A comparison study of laser based additive manufacturing techniques applied to chalcogenide glass (Conference Presentation) Nov. 18, 2019; Proceedings vol. 11175, Optifab 2019; Abstract Only.

Nathan Carlie "Nano-structured Anti-Reflective Surfaces from Edmund Optics (Conference Presentation)" Apr. 27, 2020 Proceedings vol. 11512, SPIE DCS Industry Talks 2020; 1151203 (2020) Abstract Only.

Luxexcel VisionPlatform "A turnkey product to 3D print custom ophthalmic lenses." https://www.luxexcel.com/the-luxexcel-technology/luxexcel-visionplatform/.

* cited by examiner

OPTICAL DEVICE WITH THERMALLY CONDUCTIVE FINGERS AND RELATED METHOD

GOVERNMENT RIGHTS

This invention was made with government support under contract number N689362000014 awarded by the United States Department of the Navy. The government has certain rights in the invention.

RELATED APPLICATION

This application is based upon prior filed Application No. 63/093,827 filed Oct. 20, 2020, the entire subject matter of which is incorporated herein by reference in its entirety.

TECHNICAL FIELD

The present disclosure relates to the field of optics, and, more particularly, to an optical device and related methods.

BACKGROUND

For almost two centuries, the optical community has been using a typical method of producing refractive lenses and optically transparent windows. The method starts with an optical blank that is cut, ground, and then polished/lapped to form the final optic. While this process is well suited to the simplest optics, those with a combination of planar and spherical curved surfaces, modern demands for high-definition optics are pushing the limitations of this centuries-old technology. Spherical lenses suffer from spherical aberration, which is a kind of blur caused by imperfect focusing.

Modern refractive lenses have aspheric surfaces to correct spherical and other aberrations in the lens system—the surface curvature is not constant across the aperture, as is the case for spherical surfaces. This is usually defined mathematically as the sum of a first-order curvature having a constant radius (i.e., a spherical surface) and a series of aspheric terms (i.e., intentional deviations from the spherical surface).

The more aspheric a surface, the higher order the optic. This involves more manufacturing complexity and costly modern methods of manufacture, such as computer-controlled precision polishing, single-point diamond turning (SPDT), or precision glass molding. Even these methods are somewhat limited in that they require the surfaces have rotational or translational symmetry and are not suitable for asymmetric, or freeform, surfaces.

SUMMARY

Generally, an optical device comprises an optical body having first and second opposing sides, and a plurality of passageways extending between the first and second opposing sides. The optical device includes a mirror layer carried by the optical body adjacent the second opposing side, a plurality of thermally conductive fingers extending in the plurality of passageways, and a heatsink carried by the optical body adjacent the first opposing side and coupled to the plurality of thermally conductive fingers.

More specifically, the optical device may further comprise a thermistor coupled adjacent to the second opposing side of the optical body. In some embodiments, the thermistor may abut the plurality of optical layers and be within the optical body. For example, the optical body may comprise a contiguous and integral glass material. The optical device may further comprise a plurality of connection terminals coupled to the thermistor and extending in the optical body and through the heatsink. The optical device may also comprise a controller coupled to the plurality of connection terminals and configured to sense a temperature of the mirror layer.

Moreover, the optical device may further comprise an antireflective layer carried by the optical body adjacent the second opposing side. The optical body may comprise an integral glass material. The heatsink may comprise a disc-shaped heatsink abutting the first opposing side of the optical body. The plurality of thermally conductive fingers may comprise a plurality finger sets, each finger set being radially aligned. In some embodiments, the optical device may further comprise a cover layer over the mirror layer.

Another aspect is directed to a method for making an optical device comprising forming an optical body having first and second opposing sides, and a plurality of passageways extending between the first and second opposing sides. The method comprises forming a mirror layer carried by the optical body adjacent the second opposing side, forming a plurality of thermally conductive fingers extending in the plurality of passageways, and coupling a heatsink to be carried by the optical body adjacent the first opposing side and to the plurality of thermally conductive fingers. In some embodiments, the forming of the optical body may comprise an additive manufacturing step using a glass material.

DETAILED DESCRIPTION

Figure 1:
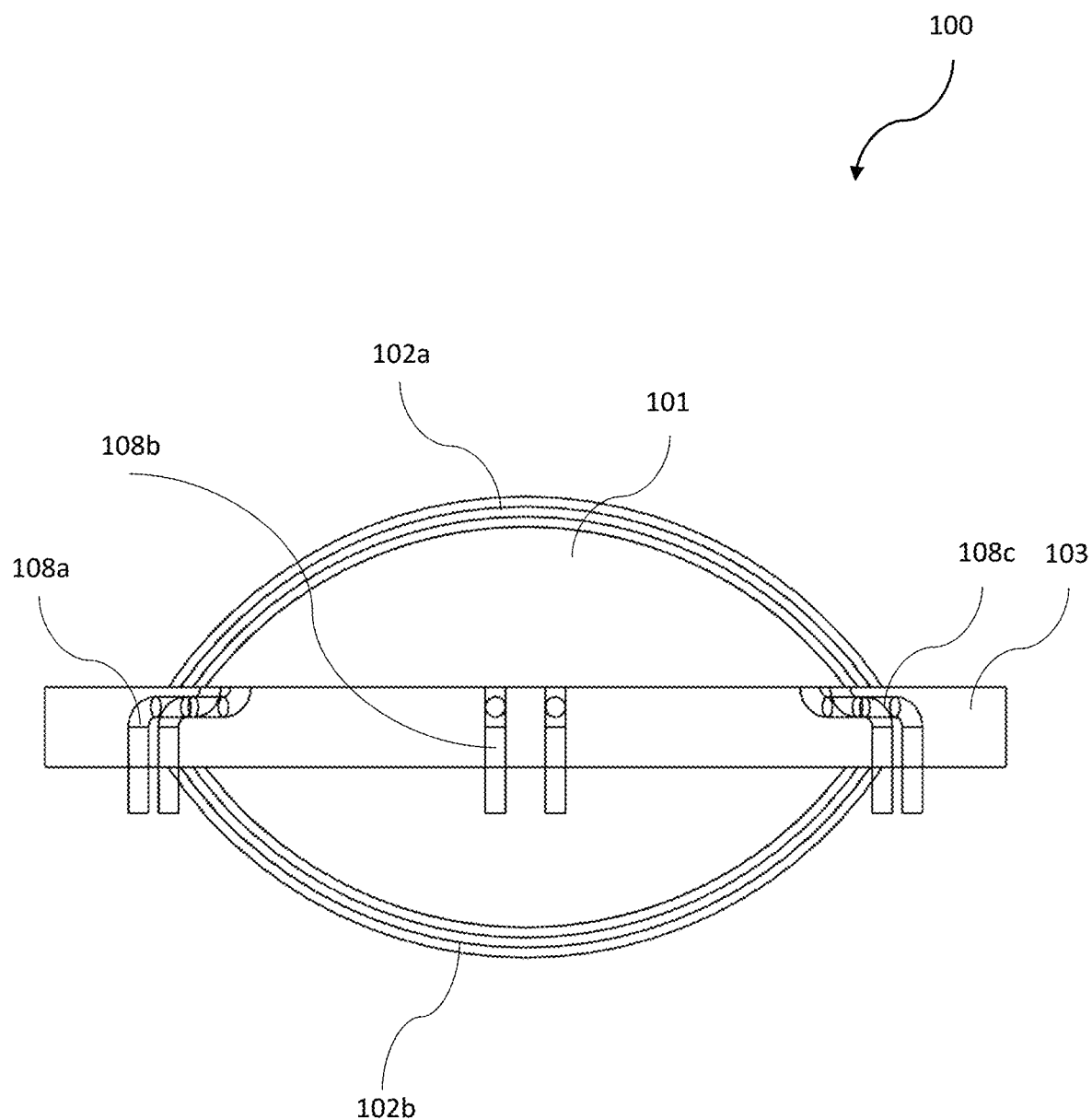
FIG. 1 is a schematic partially transparent side view of an optical element, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Generally, an optical element may include a lens body having first and second opposing curved sides, and an annular flange being integral with the lens body and extending radially from the lens body. The annular flange may be parallel with a lens center axis and perpendicular with an optical axis. The optical element may also include an antireflective coating on the first and second opposing curved sides.

Another aspect is directed to a method for making an optical element. The method may include forming via additive manufacturing a lens body having first and second opposing curved sides, and forming via additive manufacturing an annular flange being integral with the lens body and extending radially from the lens body. The annular flange may be parallel with a lens center axis and perpendicular with an optical axis.

Another aspect is directed to an optical device comprising an optical body having first and second opposing sides. The optical device may include a plurality of thermally conductive fingers extending vertically between the first and second opposing sides and through the optical body, and a heatsink carried by the optical body adjacent the first opposing side and coupled to the plurality of thermally conductive fingers. The optical device may also include a thermistor coupled to the optical body. The optical device may comprise a mirror carried by the optical body adjacent the second opposing side.

Another aspect is directed to an optical device. The optical device may comprise a base layer, a plurality of optical integrated circuit (IC) devices carried by the base layer, and a cover layer over the base layer and encapsulating the plurality of optical IC devices. The base layer may comprise a glass substrate.

The typical means of producing optics may not support the requirements for new emerging technologies that require higher resolution. These limitations are imposed by multiple factors, such as the cost for higher-order optics and the inability to improve on the existing manufacturing technology.

Additive manufacturing (AM) is a technology that is used to create three-dimensional parts using a deposition process. AM has been used to create structural elements where the optical transmission was not part of the design constraints. Recently, several approaches have fabricated optical components using AM. These components have been primarily based on organic polymers.

The AM processes that are used to create these components includes the use of inkjet printing with in situ ultraviolet curing and Selective Laser Sintering (SLS) of polymers. The creation of these transmissive optical components has allowed the rapid prototyping of non-imaging optics, display surfaces of arbitrary geometries, and GRadient INdex (GRIN) lenses. While significant progress has been made in printing transparent polymers, polymers are typically used for low cost and low power optics.

Inorganic glass substrates are primarily used in high quality, high power optics because they have high transmissivity. Glass has a lower thermal expansion coefficient and unlike organic polymers, their index of refraction is thermally stable. In addition, glass is amorphous and does have crystalline boundaries for scattering.

The disadvantages of glass is that they have significantly higher processing temperature and they are brittle. They crack easily in cooling process. These limitations makes glass AM much more challenging. In recent years, several approaches have been developed for printing of transparent glass.

With research and development of AM in inorganic glass components, the present disclosure provides an approach to creating optical components with optical functions built into the designs of the optical component itself. In the current manifestation of glass based optical components, the optical functions are done at the surfaces of the component. Take, for example, a mirror; mirrors are either front surface or back surface coated with a reflective media (such Au or Al) and then an antireflection coating is applied to reflective side of the mirror to prevent back reflection into the source.

The process of making a silver mirror is 184 years old. In 1835, German chemist Justus von Liebig developed a process for applying a thin layer of metallic silver to one side of a pane of clear glass. This same technique with some refinement in controlling the geometry of the glass is being used to create most if not all of our inorganic optical components today.

Figure 2:
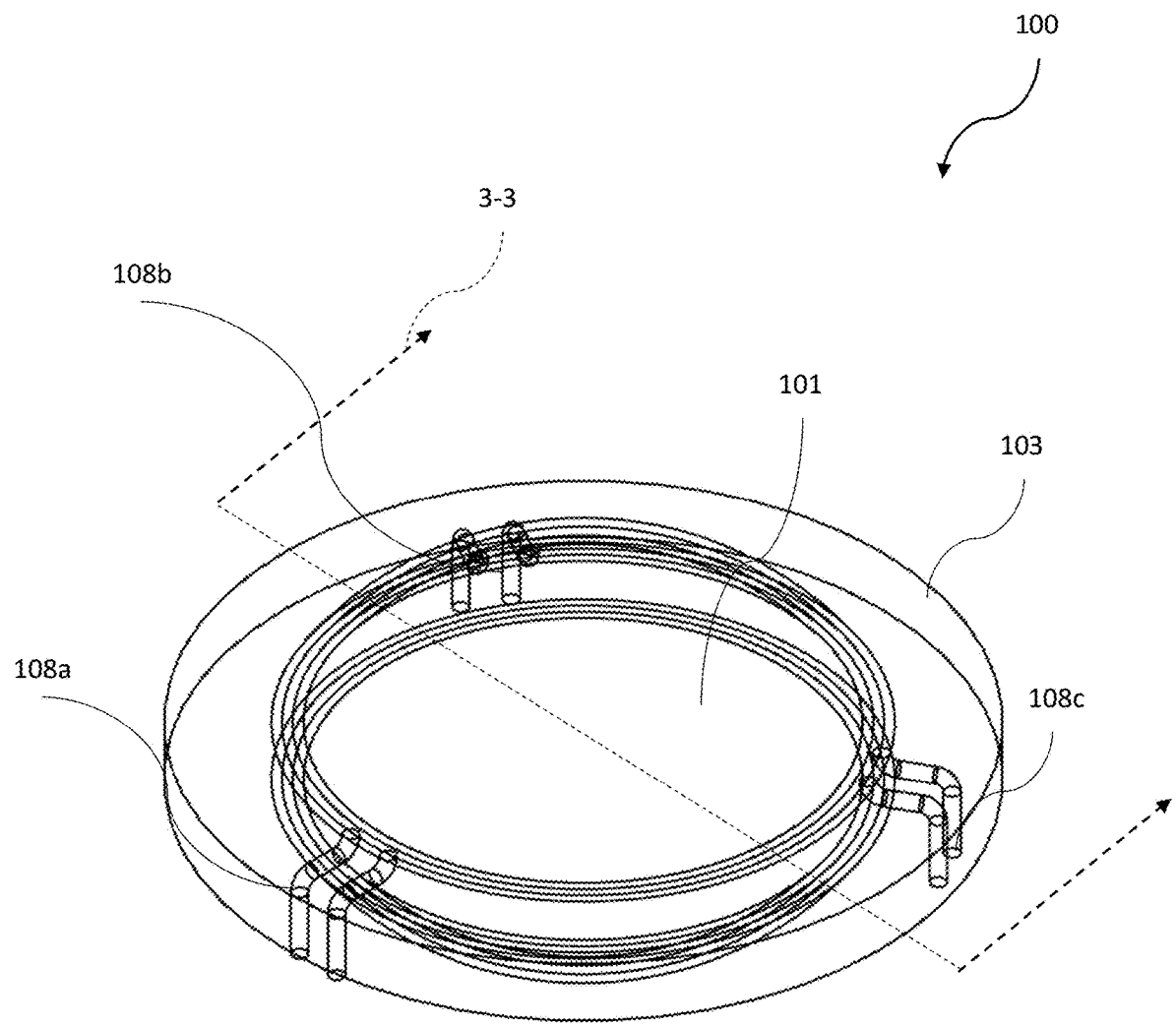
FIG. 2 is a schematic perspective view of the optical element of FIG. 1.
Figure 3:
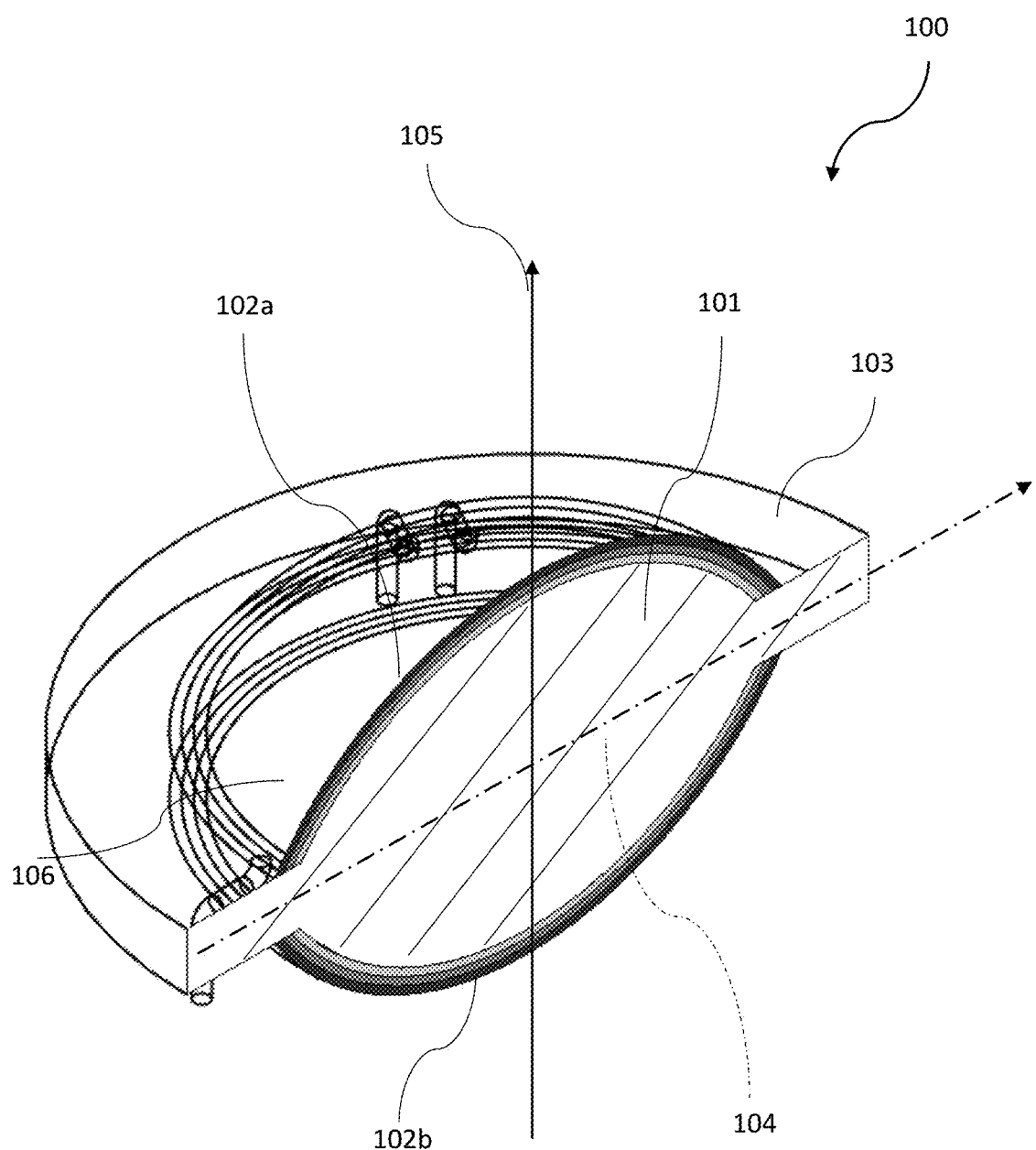
FIG. 3 is a schematic cross-section view of the optical element of FIGS. 1-2 along line 3-3.
Figure 4:
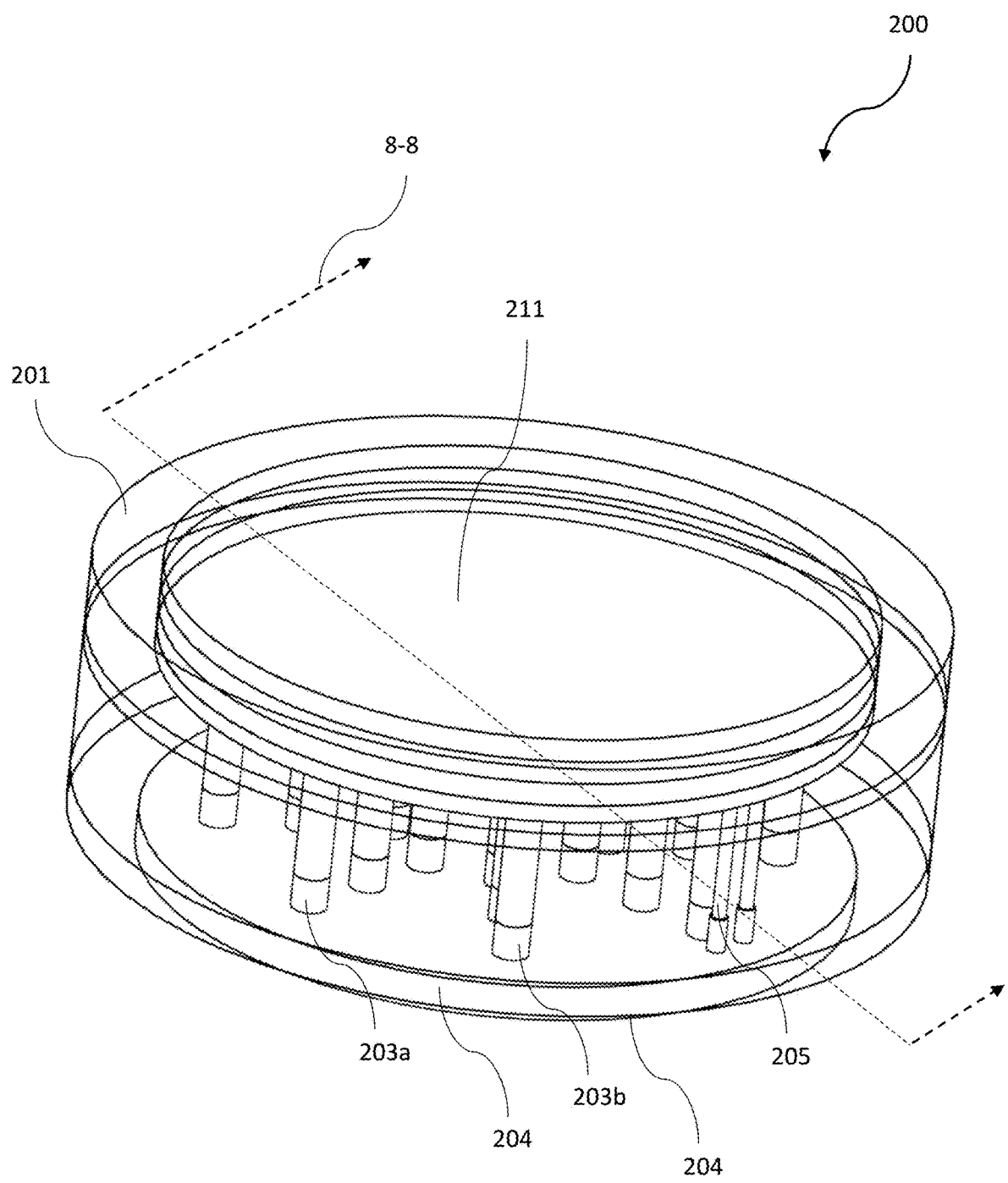
FIG. 4 is a schematic partially transparent perspective view of an optical device, according to a first embodiment of the present disclosure.
Figure 5:
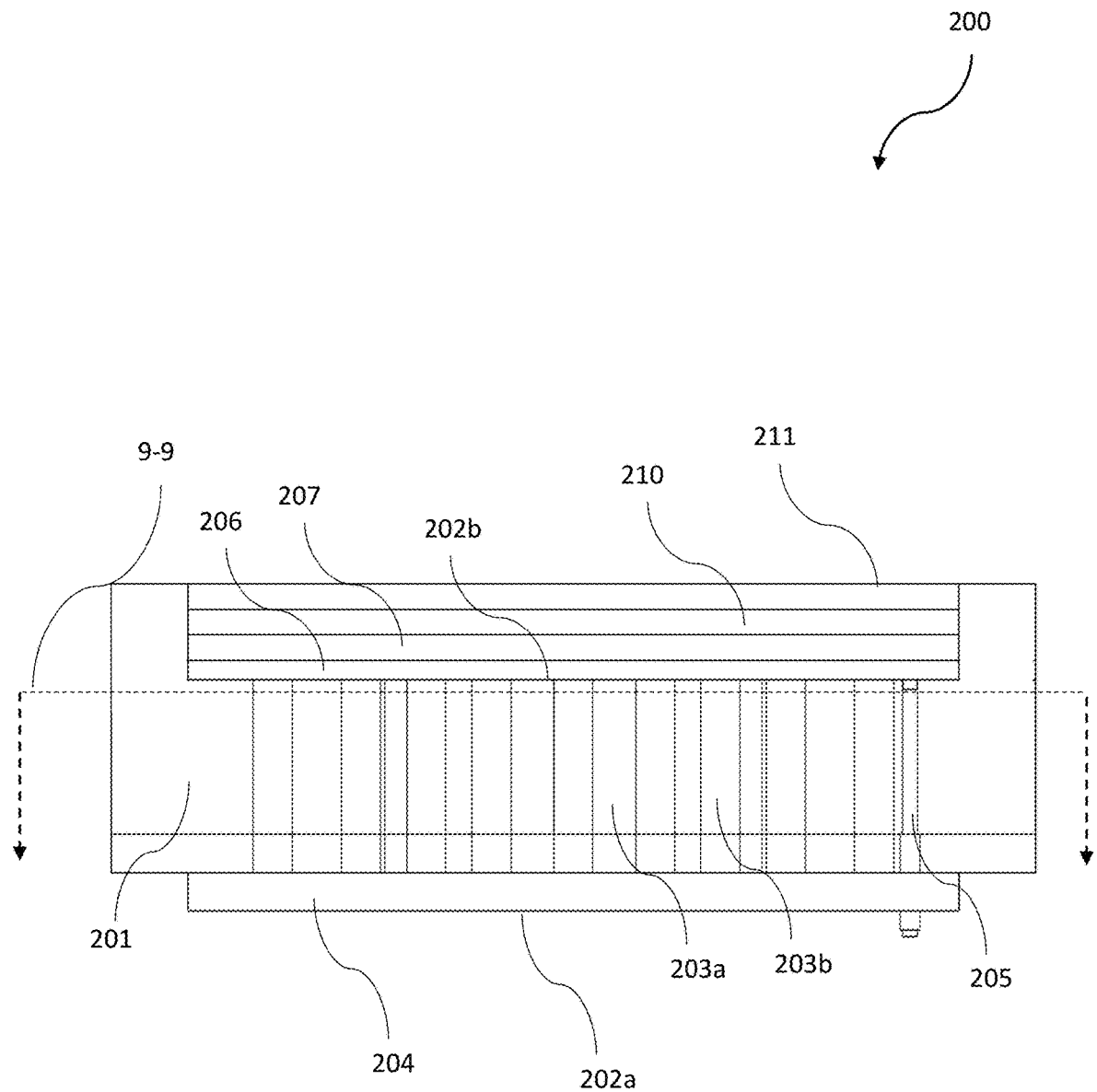
FIG. 5 is a schematic partially transparent side view of the optical device of FIG. 4.
Figure 6:
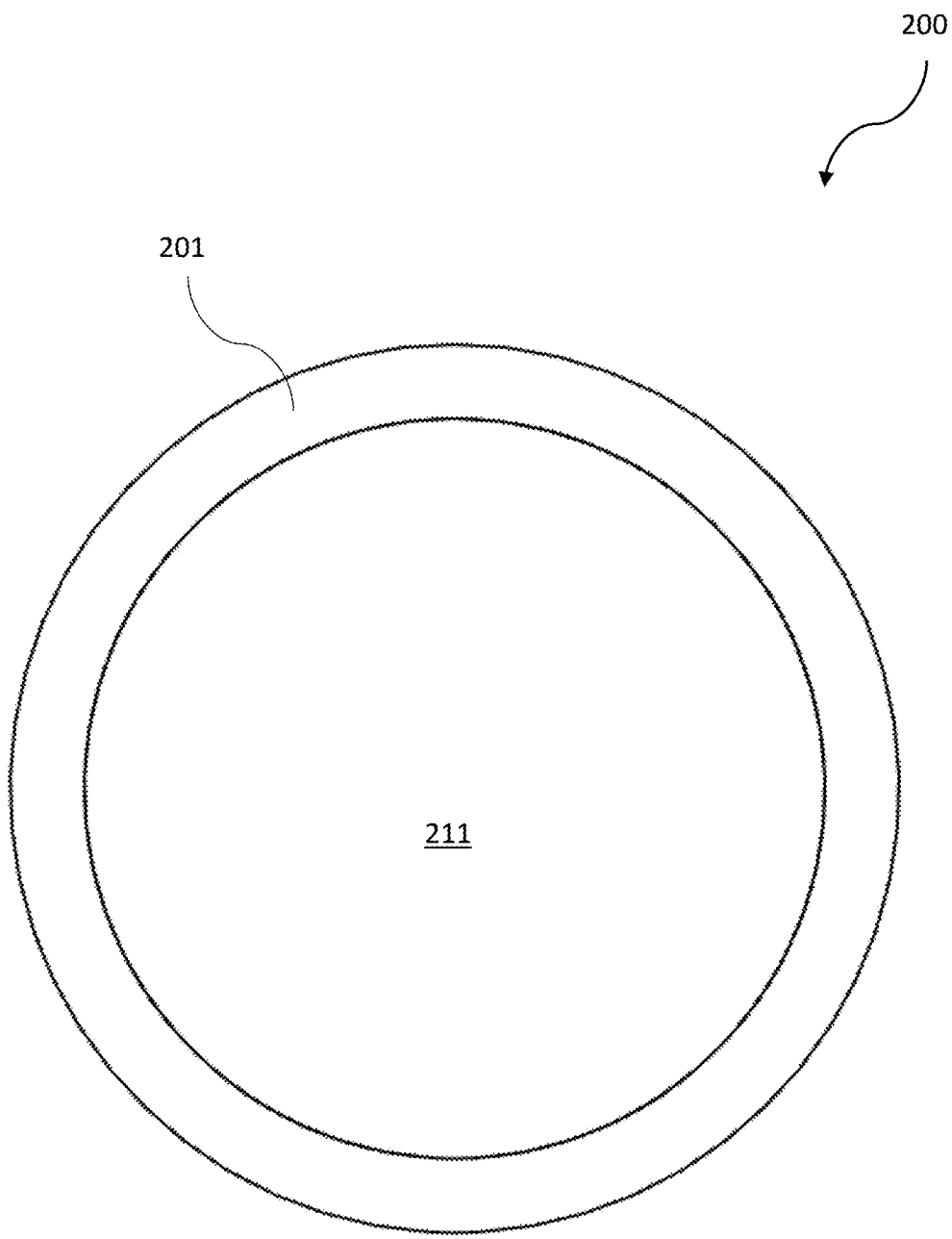
FIG. 6 is a schematic top plan view of the optical element of FIG. 4.
Figure 7:
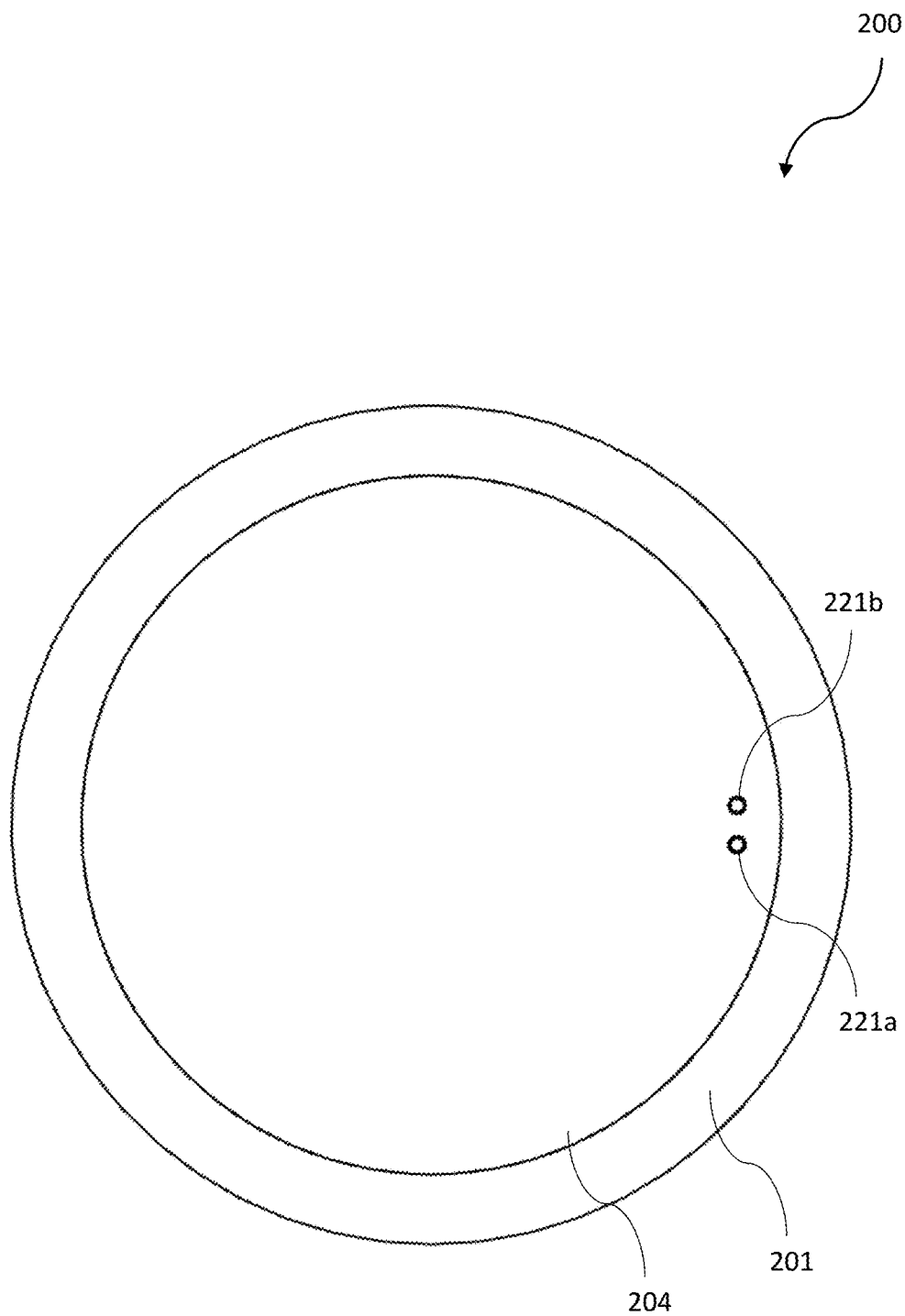
FIG. 7 is a schematic bottom plan view of the optical element of FIG. 4.

Referring initially to FIGS. 1-3, an optical element 100 according to the present disclosure is now described. As will be detailed herein, the optical element 100 is formed via AM processes (e.g. glass AM deposition). For example, the optical element 100 may be formed as a combination of sequentially formed layers (e.g. the illustrated three layers).

The optical element illustratively includes a lens body 101 having first and second opposing curved sides 102*a*-102*b*, and an annular flange 103 being integral with the lens body and extending radially from the lens body. The lens body 101 may comprise an inorganic transparent material. The annular flange 103 is substantially parallel (i.e. ±0.000565° or ±10$^{-6}$ radians of parallel) with a lens center axis 104 and substantially perpendicular (i.e. ±0.000565° or ±10$^{-6}$ radians of perpendicular) with an optical axis 105.

AM glass deposition allows for the control of the lens center axis 104 relation to the optical axis 105. Generally, and as shown in the illustrated embodiment, the lens center axis 104 and the optical axis 105 are perpendicular to each other. Helpfully, the known relation of the annular flange 103 to the optical axis 105 permits for accurate positioning within an optical device mounting device (e.g. optical lens mount). Moreover, the annular flange 103 may reduce the risk of damage to the optical element 100 during handling.

Also, the optical element 100 is a high definition optical device. This is due to the control of the curvature and purity of the layers, down to the micron layer thickness.

The optical element 100 illustratively comprises an antireflective coating 106 on the first and second opposing curved sides 102*a*-102*b*. In some embodiments, the optical element 100 can create the antireflection coating using lens material to change the index of refection of the glass to create the destructive interference of the reflected radiation. During the AM process, the antireflection properties can be grown on the lens body 101 during the deposition process. Also, some embodiments of the optical element 100 can integrate different layers of different index glasses to create a destructive interference for the reflected radiation. Also, the optical element 100 can also integrate different antireflective properties, such as moth eye antireflective effects.

Here, the optical element 100 illustratively includes a plurality of photodiodes 108a-108c carried within the annular flange 103. In some applications, the optical element 100 includes circuitry coupled to the plurality of photodiodes 108a-108c and configured to determine an angle of the optical signal passing therethrough and to determine whether beam steering is needed.

Another aspect is directed to a method for making an optical element 100. The method includes forming via additive manufacturing a lens body 101 having first and second opposing curved sides 102a-102b, and forming via additive manufacturing an annular flange 103 being integral with the lens body and extending radially from the lens body. The annular flange 103 is substantially parallel with a lens center axis 104 and substantially perpendicular with an optical axis 105.

With the use of glass AM deposition method, the geometry of the optical element 100 is grown according to any order mathematical function desired. The optical element 100 may comprise a true diffraction limited optical component (d=2.44*clear aperture/$\lambda$). In addition to controlling the geometry, in some embodiments, AM can create structures that improve the mounting of optical components to non-specialized mounts with a true surface datum transfer assuring angular and positional accuracy.

Referring now to FIGS. 4-9, an optical device 200 according to the present disclosure is now described. The optical device 200 illustratively includes an optical body 201 having first and second opposing sides 202a-202b. The optical device 200 illustratively includes a plurality of thermally conductive fingers 203a-203b extending vertically between the first and second opposing sides 202a-202b and through the optical body 201.

The optical device 200 illustratively includes a heatsink 204 carried by the optical body 201 adjacent the first opposing side 202a and coupled to the plurality of thermally conductive fingers 203a-203b (e.g. copper, gold, silver, aluminum). The optical device 200 comprises a thermistor 205 coupled to the optical body 201.

Figure 8A:
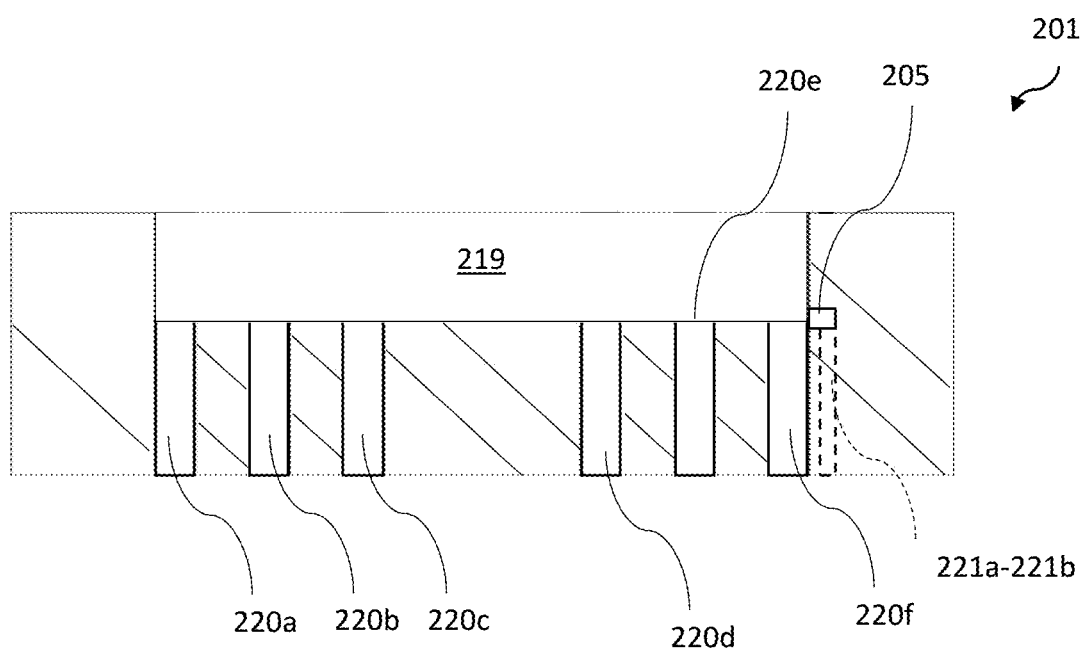
FIG. 8A is a schematic cross-section view of the optical body of FIGS. 4-7 along line 8-8.
Figure 8B:
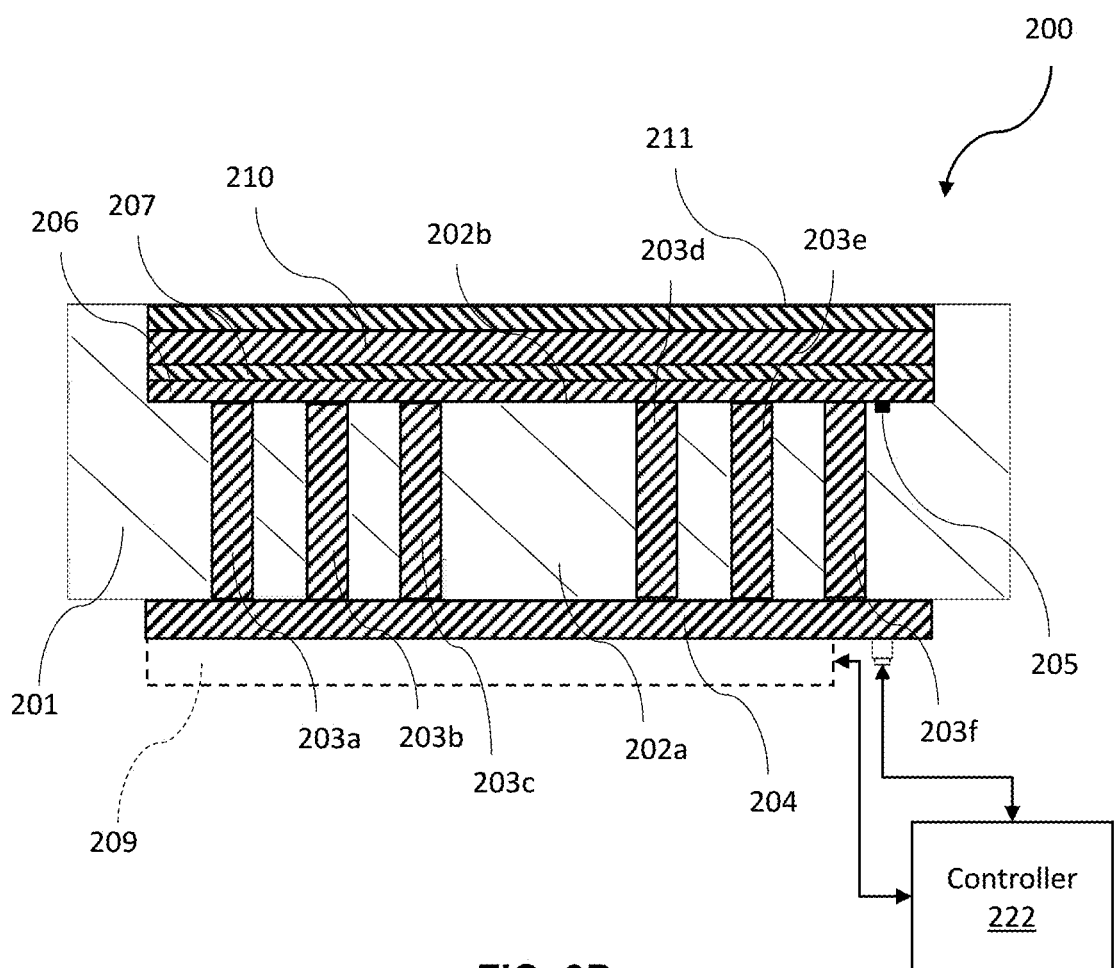
FIG. 8B is a schematic cross-section view of the optical device of FIGS. 4-7 along line 8-8.

As perhaps best seen in FIG. 8B, the second opposing side 202b of the optical device 200 illustratively comprises a stack of layers. The stack of layers comprises a heat spreader layer 206 carried by the optical body 201 adjacent the second opposing side 202b, and a plurality of cover layers 207, 210, 211. The plurality of cover layers 207, 210, 211 may comprise one or more of a mirror layer, an antireflective coating layer, and a protective layer.

Thermally controlled optics is another manifestation that AM has enabled. By creating cylindrical voids in the bulk glass substrate, one can insert thermal fingers into bulk glass substrate connecting the reflective element and the thermal reservoir. These thermal fingers allows heating or cooling of the active element of the optical component. Additionally, it allows embedding monitoring elements such as thermistors, photodiodes, etc. Additionally, similar to the embodiments of FIGS. 1-3, antireflective properties can be incorporated into this optical element.

With monitoring elements embedded in the optical device 200, a smart optical component is created, where the temperature of the optical component is set and continually monitored. With thermally controlled optics, the operating environment for imaging system or cool the system for high power laser applications can be set and controlled. Additionally, if a photodiode is embedded in the center of the optical component, one can examine the fluence through put of the component in optical alignment procedures and eventually use it track the aging of the component.

This mirror has a thermistor embedded underneath the reflective surface. As perhaps best seen in FIG. 7, it is also created with a datum transfer surface (e.g. illustrated electrodes).

Figure 10:
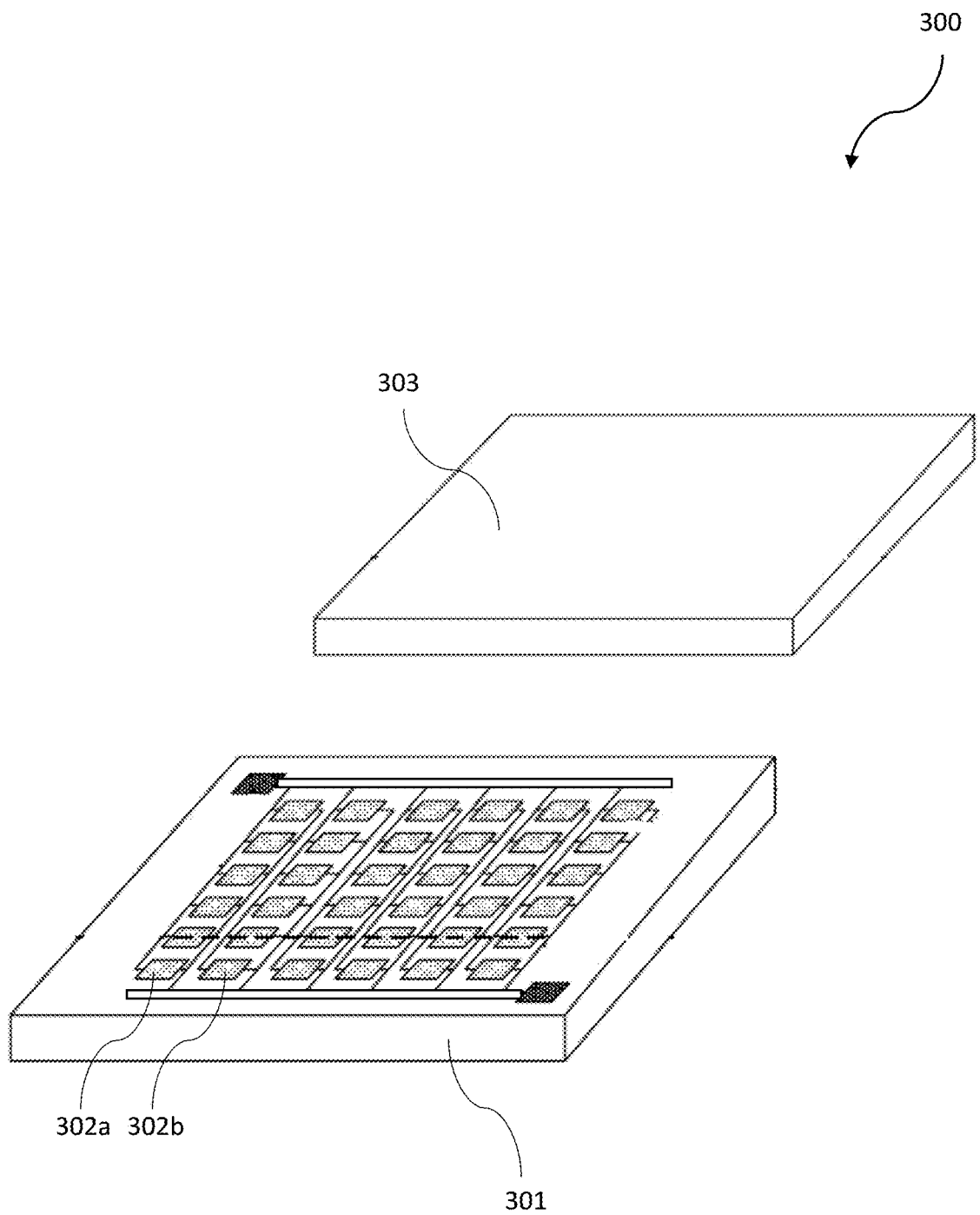
FIG. 10 is a schematic perspective view of an optical device, according to a second embodiment of the present disclosure.

Referring now to FIG. 10, another embodiment of the optical device 300 is now described. This embodiment of the optical device 300 illustratively includes a base layer 301, a plurality of optical IC devices 302a-302n carried by the base layer, and a cover layer 303 over the base layer and encapsulating the plurality of optical IC devices. The base layer 301, and the cover layer 303 may each comprise a glass substrate. Each of the plurality of optical IC devices 302a-302n may comprise one of an LED, a photodetector, a variable optical attenuator, etc.

In some applications, the plurality of optical IC devices 302a-302n may each comprise a liquid crystal (LC) cell or a high definition optical device. Also, each LC cell may comprise a special optical modulation circuit, and/or integrated photonics.

Figure 11:
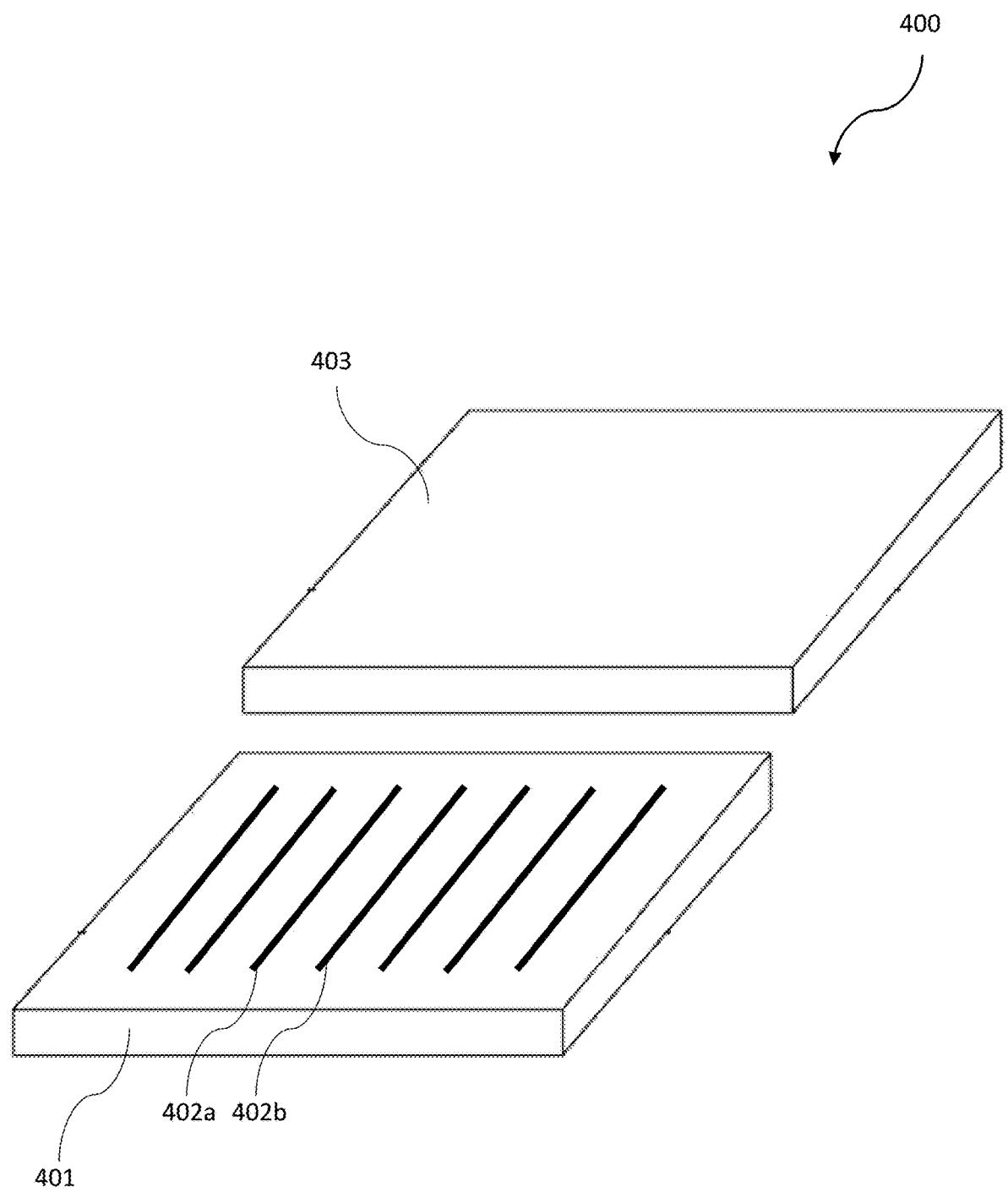
FIG. 11 is a schematic perspective view of an optical device, according to a third embodiment of the present disclosure.

Referring now additionally to FIG. 11, another embodiment of the optical device 400 is now described. In this embodiment of the optical device 400, those elements already discussed above with respect to FIG. 10 are incremented by 100 and most require no further discussion herein. This embodiment differs from the previous embodiment in that this optical device 400 illustratively includes a plurality of bus lines 402a-402b on the base layer 401. The plurality of bus lines 402a-402b may comprise nanometer or micrometer wide bus lines.

These optical devices 300, 400 enhance the optical functionality and performance of AM optical elements. FIGS. 10-11 illustrate this concept. In FIG. 10, a base layer 301 is created by depositing nanoparticles of a transparent material, such as glass using an AM method. On top of this base layer 301, another material is deposited using the AM process to create an active layer. This material can be nanoparticles of metals, semiconductors, ceramics, polymers or optically transparent and electrically conductive material such as Indium-Tin Oxide (ITO). The nanoparticles of these materials are deposited to form the active layer in different geometrical shapes. FIG. 11 shows a row of lines that have very small (nanometer or micrometer) width, and FIG. 10 shows an array square patterns that have very small thickness, width and length.

The distance between two consecutive active layers is very small so that they can interact when a high AC or DC voltage is applied across the active layer, or a light or laser beam is shined on the active layer. Under these conditions, the distribution of electrons changes in the active layer and, consequently, the refractive index of the active layer is modified. Therefore, the active layer affects the propagation of light when light passes from the bottom side to the top side of the base layer. The active layer is protected by depositing the cover layer on top of the active layer using the AM process. In some applications, the optical device 300, 400 can be used as a spatial light modulator.

Regarding the optical element 100, with the ability to control the deposition process, it can be ensured that any slice parallel to center axis of the component is perpendicular to the optical axis of the component. This relationship is preserved when mounting this lens with an optical mount whose contact surface is parallel to the center axis of the lens. The surface datum transfer ensures repeatable pitch and yaw pointing when mounting this optical component. Additionally, it provides a means of handling this component without ever touching the clear aperture of the optical component.

Building different layers of index of refraction using same bulk glass material, an antireflective surface on the optics is provided. This feature ensures that there will be less risk in damaging antireflective properties of the component as opposed to the current method thin film deposition. This feature also ensures that the optical damage threshold for this component is uniform throughout the component by design.

Regarding the optical device 200, by controlling the geometry and the layout out of the optical component, thermally controlled optics and optical fluence monitoring of the optical component are provided. Creating a spatial pattern of void in the bulk material, thermal fingers and electrodes can be inserted. The thermal fingers are connected to a thermal reservoir that can either heat or cool the optical component. Additionally, these fingers are in contact with the active material in the bulk substrate thereby controlling the temperature of the active element of this component. This method of temperature controlled is unique in that it does not introduce localized temperature gradient in the optics.

Also, with having an embedded thermistor that is in contact with active material, one can monitor the temperature of this component. This embedded thermistor provides this component with the ability to be temperature stabilized through an electronic means, such as a Phase Lock Loop (PLL) lock-in amplifier. Additionally, it can be used to monitor the health of the optical component.

The photodiode being embedded in the optical component will help in alignment of the optical component by monitoring the throughput fluence. More important and unique to this component is the ability to detect optical fluence fluctuation along the beam path of the optical train. This feature allows fault detection on the spatial layout of the optical circuit. Using this feature, one can tell real time if it there is power fluctuation of the source radiation or misalignment of the optical component and which component is misaligned.

Regarding the optical devices 300, 400, by introducing active transmissive semiconductor materials that are electrically controlled, one can dynamically control the spatial profile of the radiation and its intensity. Having these semiconductor elements individually addressable one can create unique radiation profiles and active filtering.

The embodiments of the optical element 100 and optical devices 200, 300, 400 disclosed herein may provide the following advantages. By having a monolithic process of creating optical component, this enables the pointing and stabilizing of the optical axis of this component. This enable aligning optical component more easily. Additionally, it reduces the complexity of optical mount, thereby making less expensive and universal.

By having the optical functionality incorporated into the bulk material of the optical component, this reduces the risk of damaging the optical component by handling during the manufacturing and assembling of optical system. It also reduces the amount solvent used to clean and process the optics. More importantly, the optical functions encased in the bulk media are protected from the environmental elements. This is especially important in high fluence operations.

High peak energy in optical pulses (mega joules) creates plasma as it breaks down air near index changing media. With the optical functioning optics free from air, the chance of inducing plasma in optical components are significantly reduced. Take for instance, mirrors that are used to steer optical radiation; they tend to get destroyed with high fluence sources. This is due to the plasma generated at the surface of the component, which damages the metalized reflecting surface.

The sensors embedded in optical components provide real time feedback to the optical system as to the health of the system. It provides a unique diagnostic tool for monitoring the performance of the optical circuit. It can tell you when your components are over heated or if there is a misalignment in your optical train. It also gives you fault location in your optical circuit. These sensors can be used to track the aging of the optical system.

The ability to control the temperature of an optical component significantly opens the door on the amount of energy a component can handle during a specific duration. Additionally, being able to stabilize the temperature of your imaging devices significantly increases the signal to noise ratio on your imaging system thereby increasing the dynamic range of your imaging system. Also, the transparent selectable index material embedded in bulk glass provides a new field of creating custom waveform and intensity profiles using traditional optical component without resorting to specialized crystalized components.

The disclosed embodiments encapsulate the optical function in glass and induce user defined optical functionality to the encapsulated device. Our device is produced by (a) integrating different optical functionalities, (b) growing materials of different optical functionalities, and (c) simultaneously encapsulating/packaging these functionalities into a single optical structure. No post-processing or packaging step is necessary in our invention to produce the final integrated optical device.

Figure 12:
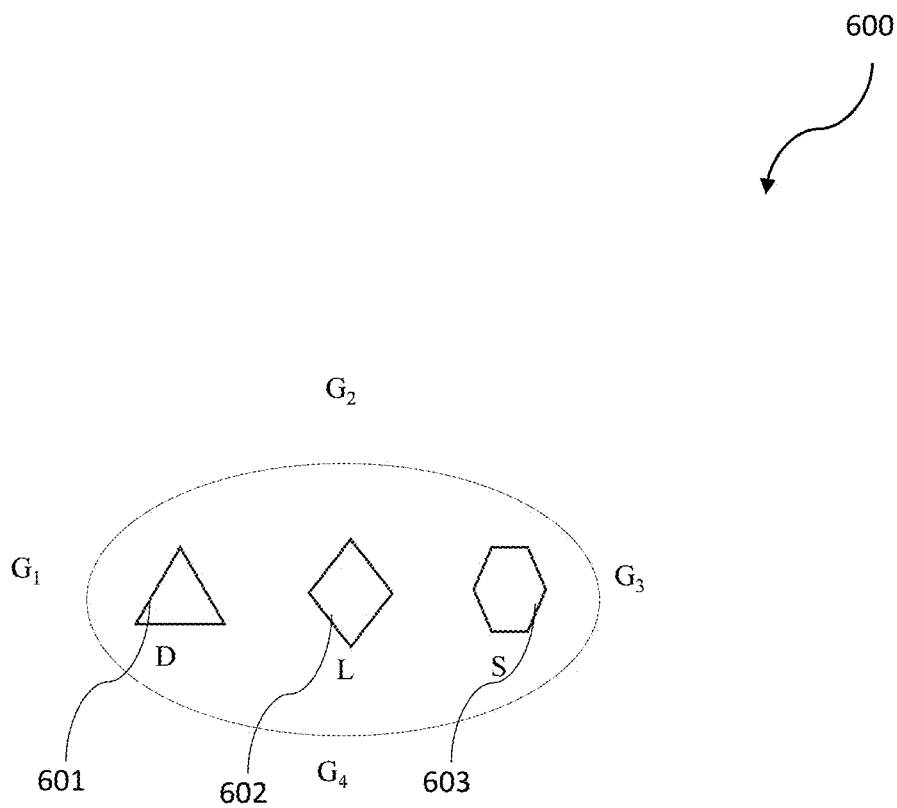
FIG. 12 is a schematic diagram of an optical device, according to a fourth embodiment of the present disclosure.

The encapsulant or the packaging material, which could be glass or any other transparent material, is also grown in our invention to induce one or multiple optical functionality to the encapsulant or the packaging material. As an example, FIG. 12 exhibits a multifunctional optical device 600 containing an absorber (e.g., detector, D 601), emitter (e.g., light-emitting diode or laser diode, L 602) and a solar cell (S 603). These optical elements are encapsulated in glass, and the glass structure is grown to create a certain geometrical shape for it to act as a lens in addition to encapsulating the other elements. Different radii of curvature can be created at different regions on the surface $G_1G_2G_3G_4$ to achieve an optically functional encapsulant with varying focal length at various regions on its surface.

The optical device of our invention can be anisotropic in multiple directions. These features are missing in the typical approaches. These typical approaches present layer by layer deposition of thin films and do not describe the encapsulation or packaging aspect of the device, nor do they describe the dual role of the encapsulant, such as the containment of optical elements and simultaneously providing one or more optical functionality. Also the stack of thin films is not anisotropic in all directions. The stack may be anisotropic in the thickness direction but each film is isotropic on its plane which is perpendicular to the direction of thickness.

Figure 13:
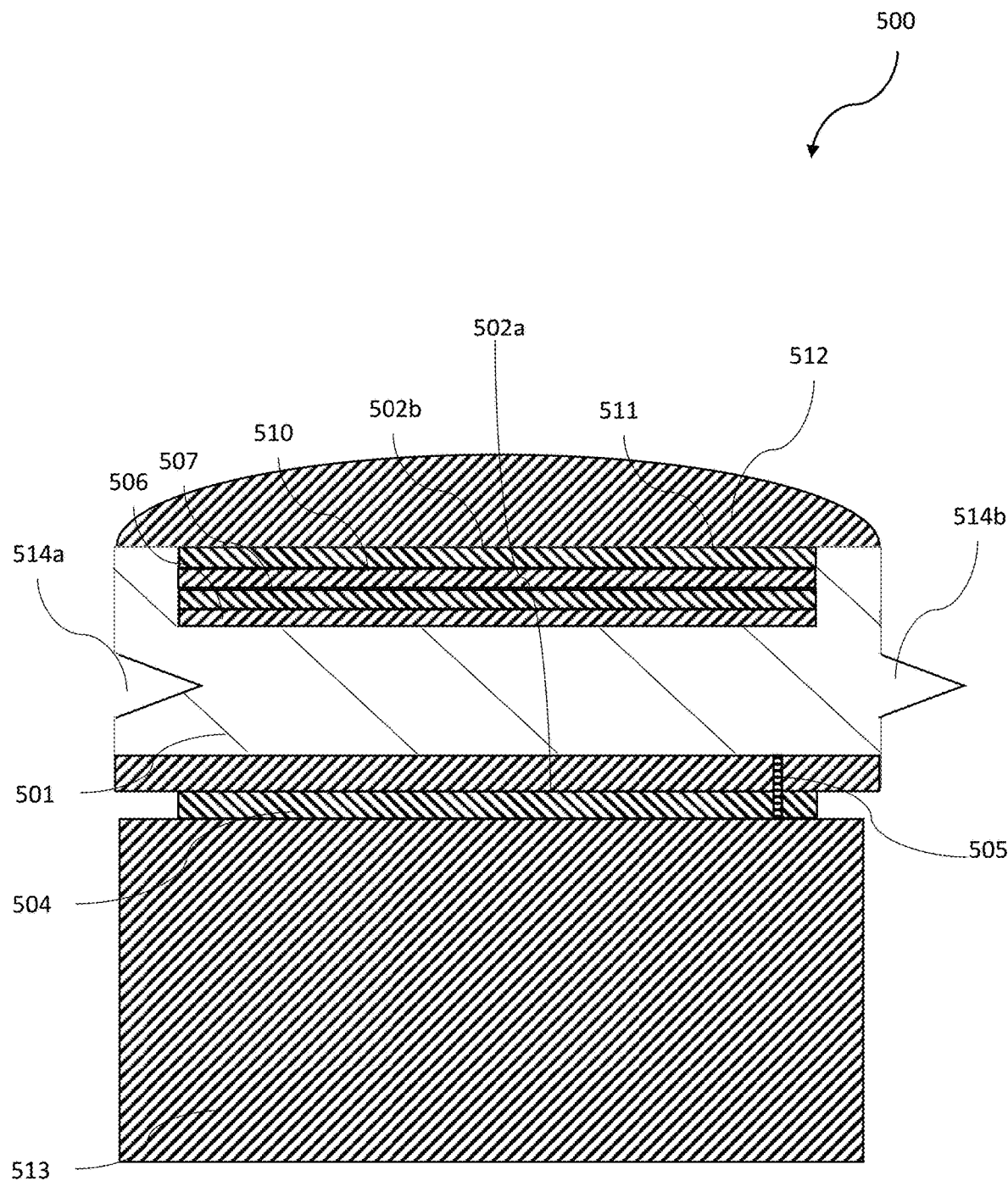
FIG. 13 is a schematic cross-section view of an optical device, according to a fifth embodiment of the present disclosure.

Referring now additionally to FIG. 13, another embodiment of the optical device 500 is now described. In this embodiment of the optical device 500, those elements already discussed above with respect to FIGS. 4-9 are incremented by 300 and most require no further discussion herein. This embodiment differs from the previous embodiment in that this optical device 500 serves as a solar concentrator device. Here, the optical device 500 illustratively comprises a convex lens 512 carried by the second opposing side 502b, and a body 513 abutting the heatsink 504. The convex lens 512 has a focal point within the optical device 500. As will be appreciated, the heatsink 504 conducts thermal energy into the body 513.

In the illustrated embodiment, a large number of the optical devices 500 may be assembled into a tile pattern via interlocking features 514a-514b on opposing sides. Because of the small size scale of the optical device 500, the pattern of the optical devices may be fitted to a variety of surfaces, such as uneven and curved surfaces. In some applications, the pattern of the optical devices may be used to passively heat a large body 513 and thermally isolate the heated reservoir because of the poor thermal conduction of glass (e.g. a water tank). Another aspect is directed to an optical system comprising an array of the optical devices 500.

An optical element comprises a lens body having first and second opposing curved sides, and an annular flange being integral with the lens body and extending radially from the lens body. The annular flange is parallel with a lens center axis and perpendicular with an optical axis. The optical element further comprises an antireflection coating on the first and second opposing curved sides.

A method for making an optical element comprises forming via additive manufacturing a lens body having first and second opposing curved sides, and forming via additive manufacturing an annular flange being integral with the lens body and extending radially from the lens body. The annular flange is parallel with a lens center axis and perpendicular with an optical axis.

An optical device comprises a base layer, a plurality of optical IC devices carried by the base layer, and a cover layer over the base layer and encapsulating the plurality of optical IC devices. The base layer comprises a glass substrate.

Referring again to FIGS. 4-9, an optical device 200 according to the present disclosure is now described. The optical device 200 illustratively includes an optical body 201 having first and second opposing sides 202a, 202b, and a plurality of passageways 220a-220f extending between the first and second opposing sides. As seen in FIG. 8A, the optical body 201 also comprises a plurality of probe passageways 221a, 221b extending between the first and second opposing sides 202a, 202b. The plurality of passageways 220a-220f and the plurality of probe passageways 221a, 221b are each illustratively cylinder-shaped, but may take on other shapes as will be appreciated.

The optical device 200 illustratively comprises a plurality of thermally conductive fingers 203a-203f (e.g. copper, gold, silver, aluminum) extending in the plurality of passageways 220a-220f, and a heatsink 204 (e.g. copper, gold, silver, aluminum) carried by the optical body 201 adjacent the first opposing side 202a and coupled to the plurality of thermally conductive fingers.

The optical device 200 illustratively comprises a heat spreader layer 206 carried by the optical body 201 adjacent the second opposing side 202b and thermally coupled to the plurality of thermally conductive fingers 203a-203f, and a mirror layer 207 (e.g. silver) over the heat spreader layer.

The optical device 200 illustratively comprises an antireflective layer 210 over the mirror layer 207, and a cover layer 211 over the mirror layer 207. The cover layer 211 may comprise a protective layer of glass in some embodiments. As perhaps best seen in FIG. 8A, the optical body 201 defines a circle-shaped flange on the second opposing side 202b with a recess 219 therein. The cover layer 211 defines an air-tight and/or hermetic seal (and temperature stable) for the layers underneath. In embodiments where the cover layer 211 comprises identical glass material as the optical body 201, this may reduce coefficient of thermal expansion (CTE) mismatch and compromising of the seal under operation and thermal stress. Moreover, this process provides for more mechanically robust optics since the cover layer 211 is glass, rather than polymer plastic.

The optical body 201 may comprise an integral glass material. In some embodiments, the optical body 201 and the mirror layer 207 are formed via one or more steps in an additive manufacturing process. In some embodiments, the optical body 201 comprises a contiguous and integral glass material (i.e. a single integral piece), for example.

As will be appreciated, the plurality of thermally conductive fingers 203a-203f thermally conducts thermal energy from the mirror layer 207 to the heatsink 204 for external radiation from the optical device 200.

The optical device 200 further comprises a thermistor 205 coupled adjacent to the second opposing side 202b of the optical body 201. The optical device 200 further comprises a plurality of connection terminals 221a-221b coupled to the thermistor 205 and extending in the plurality of probe passageways 221a, 221b and through the heatsink 204. The optical device 200 illustratively includes a controller 222 coupled to the plurality of connection terminals 221a-221b and configured to sense a temperature of the heat spreader layer 206. As will be appreciated, the controller 222 is configured to monitor the thermal state of the optical device 200.

In the illustrated embodiment, the optical device 200 further comprises an active cooling device 209 (illustrated with dashed lines) carried by the heatsink 204 and coupled to the controller 222. For example, the active cooling device 209 may comprise a thermoelectric cooling element, a fan and finned heatsink structure, or a liquid cooling apparatus. The controller 222 is configured to activate the active cooling device 209 when the temperature of the heat spreader layer 206 exceeds a threshold value.

The heatsink 204 illustratively includes a disc-shaped heatsink abutting the first opposing side 202a of the optical body 201. In other embodiments, the heatsink 204 may have other shapes, including non-planar fin arrangements.

Figure 9:
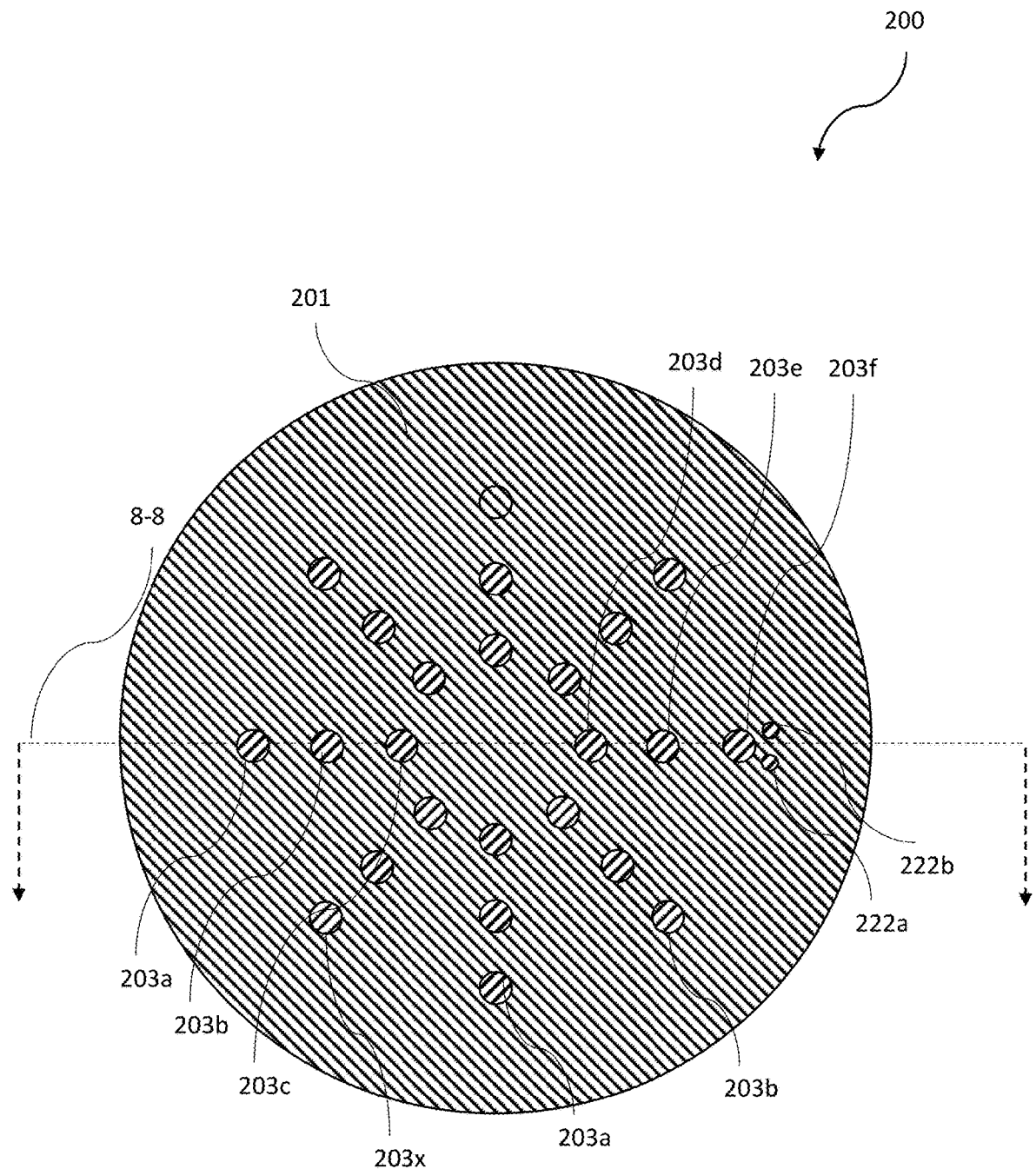
FIG. 9 is a schematic cross-section view of the optical device of FIGS. 4-7 along line 9-9.

As perhaps best seen in FIG. 9, the plurality of thermally conductive fingers 202a-203x (for drawing clarity, only 203a-203f & 203e-203f and 203x are labeled) may comprise a plurality finger sets (e.g., 203a-203f & 203e-203f), each finger set being radially aligned. In particular, the thermally conductive fingers 202a-203x are arranged in a symmetric star pattern for efficient thermal radiation from the mirror layer 207.

Another aspect is directed to a method for making an optical device 200 comprising forming an optical body 201 having first and second opposing sides 202a, 202b, and a plurality of passageways 220a-220f extending between the first and second opposing sides. In some embodiments, this forming of the optical body 201 comprises one or more additive manufacturing steps. More specifically, the forming of the optical body 201 may comprise an additive manufacturing step using a glass material, for example.

The method comprises forming a plurality of thermally conductive fingers 203a-203f extending in the plurality of passageways 220a-220f and a heat spreader layer 206. The plurality of passageways 220a-220f and the heat spreader layer 206 may comprise an identical thermally conductive material. The method includes forming a mirror layer 207 on the heat spreader layer 206 and carried by the optical body 201 adjacent the second opposing side 202b. The method comprise forming an antireflective layer 210 on the mirror layer 207, and forming a cover layer 211 on the antireflective layer 210.

The method includes coupling a heatsink 204 to be carried by the optical body adjacent the first opposing side 202a and to the plurality of thermally conductive fingers.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An optical device comprising:
an optical body having
first and second opposing sides,
a plurality of passageways extending between the first and second opposing sides, and
a peripheral flange at the second opposing side defining a recess therein, the optical body comprising contiguous and integral glass material;
a plurality of optical layers carried by the optical body entirely within the recess, the plurality of optical layers comprising
a mirror layer, and
an uppermost cover layer over the mirror layer, and aligned with and to be flush with uppermost portions of the peripheral flange;
a plurality of thermally conductive fingers extending in the plurality of passageways;
a thermistor abutting the plurality of optical layers and being within the optical body;
a heatsink carried by the optical body adjacent the first opposing side and coupled to the plurality of thermally conductive fingers;
an active cooling device carried by the heatsink; and
a controller coupled to the thermistor and the active cooling device, the controller configured to
sense a temperature of the mirror layer, and
activate the active cooling device when the temperature of the mirror layer exceeds a threshold value.

2. The optical device of claim 1 further comprising a plurality of connection terminals coupled to the thermistor and extending in the optical body and through the heatsink.

3. The optical device of claim 1 wherein the plurality of optical layers further comprises an antireflective layer.

4. The optical device of claim 1 wherein the heatsink comprises a disc-shaped heatsink abutting the first opposing side of the optical body.

5. The optical device of claim 1 wherein the plurality of thermally conductive fingers comprise a plurality finger sets, each finger set being radially aligned.

6. The optical device of claim 1 wherein the plurality of optical layers comprises a heat spreader layer between the mirror layer and the plurality of thermally conductive fingers.

7. The optical device of claim 1 wherein the plurality of thermally conductive fingers each comprises at least one from copper, gold, silver, and aluminum.

8. The optical device of claim 1 wherein the controller is configured to continuously sense the temperature of the mirror layer.

9. The optical device of claim 1 further comprising a photodiode within the optical body and configured to sense fluence throughput.

10. A method for making an optical device comprising:
using additive manufacturing with a glass material to form an optical body having
first and second opposing sides,
a plurality of passageways extending between the first and second opposing sides, and
a peripheral flange at the second opposing side defining a recess therein, the optical body comprising contiguous and integral glass material;
forming a plurality of optical layers carried by the optical body entirely within the recess, the plurality of optical layers comprising
a mirror layer, and
an uppermost cover layer over the mirror layer, and aligned with and to be flush with uppermost portions of the peripheral flange;
forming a plurality of thermally conductive fingers extending in the plurality of passageways;
coupling a thermistor to abut the plurality of optical layers and being within the optical body;
coupling a heatsink to be carried by the optical body adjacent the first opposing side and to the plurality of thermally conductive fingers
coupling an active cooling device to be carried by the heatsink; and
coupling a controller to the thermistor and the active cooling device, the controller configured to
sense a temperature of the mirror layer, and
activate the active cooling device when the temperature of the mirror layer exceeds a threshold value.

11. The method of claim 10 further comprising coupling a plurality of connection terminals coupled to the thermistor and extending in the optical body and through the heatsink.

12. A smart optical device comprising:
an optical body having
first and second opposing sides,
a plurality of passageways extending between the first and second opposing sides, and
a peripheral flange at the second opposing side defining a recess therein, the optical body comprising contiguous and integral glass material;
a plurality of optical layers carried by the optical body entirely within the recess, the plurality of optical layers comprising
a mirror layer, and
an uppermost cover layer over the mirror layer, and aligned with and to be flush with uppermost portions of the peripheral flange;
a plurality of thermally conductive fingers extending in the plurality of passageways;
a thermistor abutting the plurality of optical layers and being within the optical body;
a heatsink carried by the optical body adjacent the first opposing side and coupled to the plurality of thermally conductive fingers;
a photodiode within the optical body and configured to sense fluence throughput;
an active cooling device carried by the heatsink; and
a controller coupled to the thermistor and the active cooling device, the controller configured to
continuously sense a temperature of the mirror layer, and
activate the active cooling device when the temperature of the mirror layer exceeds a threshold value.

13. The smart optical device of claim 12 further comprising a plurality of connection terminals coupled to the thermistor and extending in the optical body and through the heatsink.

14. The smart optical device of claim 12 wherein the plurality of optical layers further comprises an antireflective layer.

15. The smart optical device of claim 12 wherein the heatsink comprises a disc-shaped heatsink abutting the first opposing side of the optical body.

16. The smart optical device of claim 12 wherein the plurality of thermally conductive fingers comprise a plurality finger sets, each finger set being radially aligned.

17. The smart optical device of claim 12 wherein the plurality of optical layers comprises a heat spreader layer between the mirror layer and the plurality of thermally conductive fingers.

18. The smart optical device of claim 12 wherein the plurality of thermally conductive fingers each comprises at least one from copper, gold, silver, and aluminum.

* * * * *